(12) United States Patent
Wasa et al.

(10) Patent No.: US 7,457,068 B2
(45) Date of Patent: Nov. 25, 2008

(54) MAGNETIC DISK DRIVE WITH EFFICIENT POWER GENERATION

(75) Inventors: Nobuhiko Wasa, Kanagawa (JP); Masahiro Shimizu, Kanagawa (JP); Sumio Obata, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/475,770

(22) Filed: Jun. 26, 2006

(65) Prior Publication Data

US 2006/0294405 A1   Dec. 28, 2006

(30) Foreign Application Priority Data

Jun. 27, 2005   (JP)   ............................. 2005-187373

(51) Int. Cl.
*G11B 19/02*   (2006.01)
*G11B 21/02*   (2006.01)
(52) U.S. Cl. .......................................... 360/69; 360/75
(58) Field of Classification Search ........................ None
See application file for complete search history.

(56) References Cited

U.S. PATENT DOCUMENTS

| 5,629,608 | A  | * | 5/1997 | Budelman .................... 323/268 |
| 2004/0012263 | A1 | * | 1/2004 | Hussein et al. ................ 307/18 |
| 2005/0200998 | A1 | * | 9/2005 | Rowan ......................... 360/69 |
| 2006/0022640 | A1 | * | 2/2006 | Frith et al. ................... 320/125 |
| 2006/0103965 | A1 | * | 5/2006 | Tanner et al. ................. 360/69 |

* cited by examiner

*Primary Examiner*—Andrew L. Sniezek
(74) *Attorney, Agent, or Firm*—Townsend and Townsend and Crew LLP; Patrick Duncan (57) ABSTRACT

Embodiments of the invention provide a magnetic disk drive having increased efficiency of generation of power for its internal low-voltage blocks. In one embodiment, a magnetic disk drive comprises a main power supply unit for supplying power of a predetermined voltage to a load, the main power supply unit including a switching regulator; a power monitoring circuit for detecting the power supplied from the main power supply unit to the load and for determining whether the detected power exceeds a predetermined power level; and a third power supply unit, if it is determined that the power supplied from the main power supply unit to the load exceeds the predetermined power level, for supplying power of the predetermined voltage to the load, the third power supply unit including a linear regulator.

17 Claims, 5 Drawing Sheets

MAGNETIC DISK DRIVE WITH EFFICIENT POWER GENERATION

CROSS-REFERENCES TO RELATED APPLICATIONS

This application claims priority from Japanese Patent Application No. JP2005-187373, filed Jun. 27, 2005, the entire disclosure of which is incorporated herein by reference.

BACKGROUND OF THE INVENTION

The present invention relates to magnetic disk drives such as hard disk drives.

In recent years, there has been a need to reduce the power consumption of electronics devices in many applications. This requires reducing the power consumption of magnetic disk drives, such as hard disk drives, used within these electronics devices. For example, to increase the operating time of a notebook computer, it is necessary to reduce the power consumption of its built-in hard disk drive.

On the other hand, there has been also a need to increase the capacity and the speed of hard disk drives, and therefore the data read/write rates have been increased over the years. This has led to an increase in the power consumption of circuits related to data read or write, such as the analog block of the channel and the serial ATA low-voltage block, preventing the power consumption of the hard disk drive from being reduced.

To address this problem, the operating voltage of the circuits has been reduced to, for example, 1.5 V, thereby reducing the power consumption. However, since the main unit of the electronics device (that is, the host side) usually supplies only 5 V of power to the hard disk drive, conventionally the following circuits are added to generate a power supply voltage of 1.5 V. A first linear regulator is provided within the analog IC to transform the 5 V power supply voltage to generate a 3.3-V voltage signal. Furthermore, the channel IC includes a second linear regulator. With this arrangement, the channel IC receives the 3.3-V voltage signal produced by the first linear regulator and changes it to a 1.5-V power supply voltage by use of the second linear regulator.

BRIEF SUMMARY OF THE INVENTION

The above conventional power supply voltage generating method, which employs two linear regulators to provide a 1.5-V power supply voltage, is disadvantageous in that the operating efficiency of the linear regulators is low since the load current of the blocks receiving the 1.5-V power supply is relatively large.

The present invention has been devised in view of the above problems. It is, therefore, a feature of the present invention to provide a magnetic disk drive having increased efficiency of generation of power for its internal low-voltage blocks such as the analog block of the channel and the serial ATA low-voltage block.

To solve the above problems of the prior art, the present invention provides a magnetic disk drive comprising: a magnetic recording medium; a magnetic head for writing/reading information to/from the magnetic recording medium; a position control unit for moving the magnetic head relative to the magnetic recording medium; a main power supply unit for supplying power of a predetermined voltage to a load, the main power supply unit including a switching regulator; a determination unit for detecting the power supplied from the main power supply unit to the load and for determining whether the detected power exceeds a predetermined power level; and a sub-power supply unit, if the determination unit determines that the power supplied from the main power supply unit to the load exceeds the predetermined power level, for supplying power of the predetermined voltage to the load, the sub-power supply unit including a linear regulator.

DETAILED DESCRIPTION OF THE INVENTION

Figure 1:
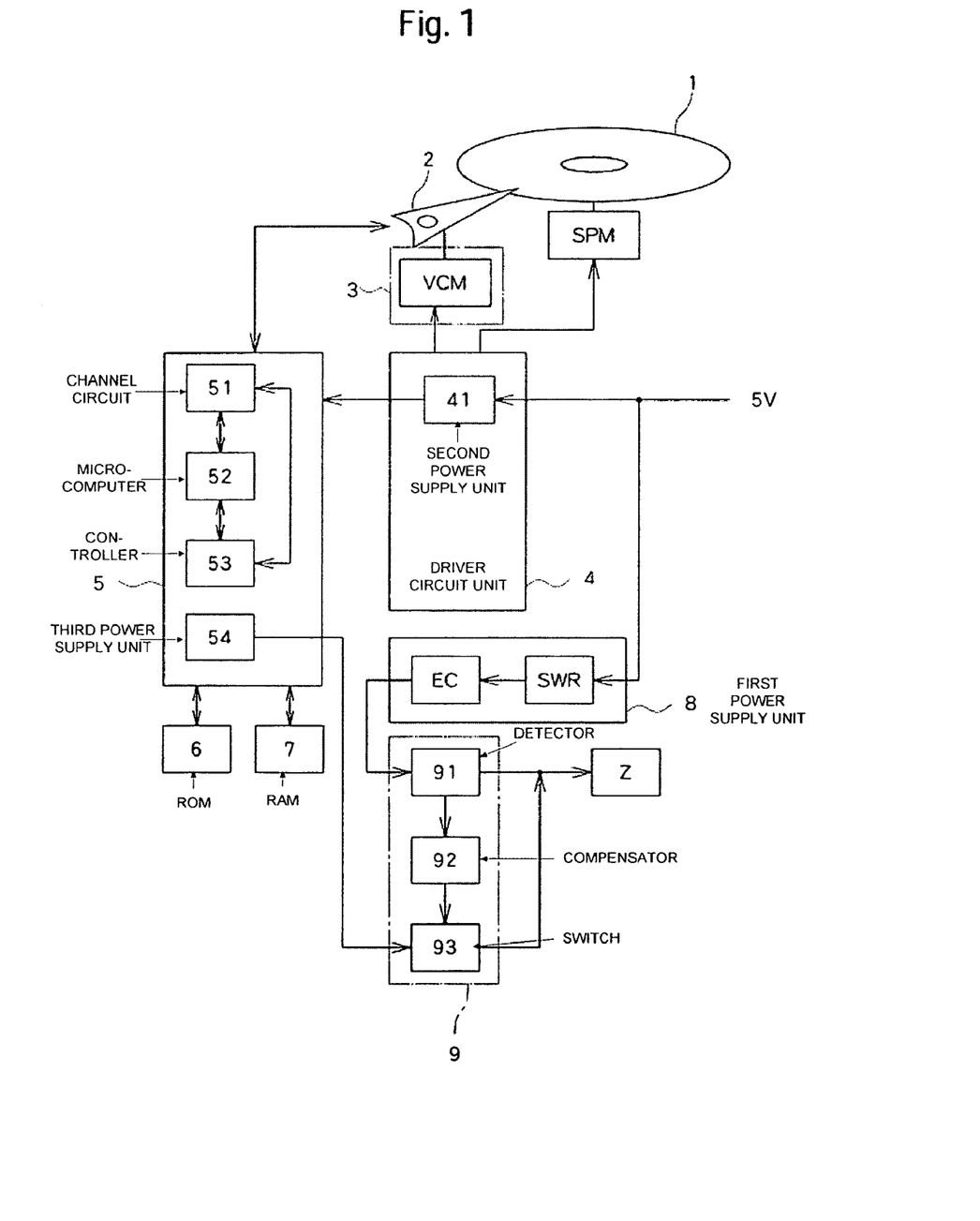
FIG. 1 is a block diagram showing the configuration of a disk drive according to an embodiment of the present invention.

An exemplary embodiment of the present invention will be described with reference to the accompanying drawings. Referring to the figure, a magnetic disk drive of the present embodiment comprises a magnetic recording medium 1, a magnetic head unit 2, a position control unit 3, a driver circuit unit 4, a composite integrated circuit unit 5, a ROM unit 6, a RAM unit 7, a first power supply unit 8, and a power monitoring circuit 9. The first power supply unit 8 and the power monitoring circuit 9 constitute the main power supply unit for supplying power to a load Z. It should be noted that the driver circuit unit 4, the composite integrated circuit unit 5, the ROM unit 6, the RAM unit 7, the first power supply unit 8, and the power monitoring circuit 9 are all mounted on the same printed board. It should be further noted that the load Z corresponds to the low-voltage blocks within the magnetic disk drive (a channel circuit 51 in the composite integrated circuit unit 5, etc.)

The magnetic recording medium 1 is in a disk shape and is rotated by a spindle motor (SPM). The magnetic head unit 2 writes information to the magnetic recording medium 1. The magnetic head unit 2 also reads information written on the magnetic recording medium 1. The magnetic head unit 2 includes a support unit for supporting the magnetic head and a head amplifier for amplifying the signals input to and output from the magnetic head.

The position control unit 3 includes a voice coil motor (VCM) for moving the magnetic head unit 2 relative to the magnetic recording medium 1.

The driver circuit unit 4 is an analog integrated circuit that includes a motor driver for driving the SPM, the VCM, etc. and a shock sensor circuit. The driver circuit unit 4 also includes a second power supply unit 41 for providing a power supply voltage. The second power supply unit 41 is made up of a linear regulator and transforms the 5 V power supply voltage provided by the host side to produce a 3.3-V power supply voltage as a first predetermined voltage.

The composite integrated circuit unit 5 is what is called a "system on a chip"(SoC) and includes the channel circuit 51, a microcomputer 52, a controller 53, and a third power supply unit 54. The composite integrated circuit unit 5 is an integrated circuit manufactured by a process similar to that for digital ICs, and is driven primarily by the power supplied from the driver circuit unit 4 and the first power supply unit 8.

The channel circuit 51 encodes information to be written to the magnetic recording medium 1 and outputs it to the head amplifier of the magnetic head unit 2. This circuit also decodes the signal read by the magnetic head unit 2 from the magnetic recording medium 1, and outputs the decoded data. Furthermore, the channel circuit unit 51 includes a serial interface circuit (serial ATA, etc.) for transmitting/receiving to/from the controller 53 information read from or to be written to the magnetic recording medium 1.

The microcomputer 52 is a program-controlled device that operates according to a program stored in its built-in memory. The microcomputer 52 performs processing to control the position of the magnetic head unit 2, initialize each integrated circuit, etc.

The controller 53 is a hard disk controller for transmitting/receiving to/from the host the information read from or to be written to the magnetic recording medium 1. For example, the controller 53 receives information to be written to the magnetic recording medium 1 from the host and outputs this information to the channel circuit 51 after adding an error correction code to it. The controller 53 also receives from the channel circuit 51 the information read from the magnetic recording medium 1 and outputs this information to the host after performing error correction processing on it.

The third power supply unit 54 is made up of a linear regulator and transforms the 3.3 V power supply voltage provided by the second power supply unit 41 of the driver circuit unit 4 to supply power of a predetermined voltage (1.5 V).

The ROM (Read Only Memory) unit 6 includes EEPROM (Electrical Erasable Programmable Read Only Memory). The ROM unit 6 stores programs that are executed by the microcomputer 52 in the composite integrated circuit unit 5, as well as parameters used during the execution of the programs. The RAM (Random Access Memory) unit 7 stores information to be written to or read from the magnetic recording medium 1.

Figure 2:
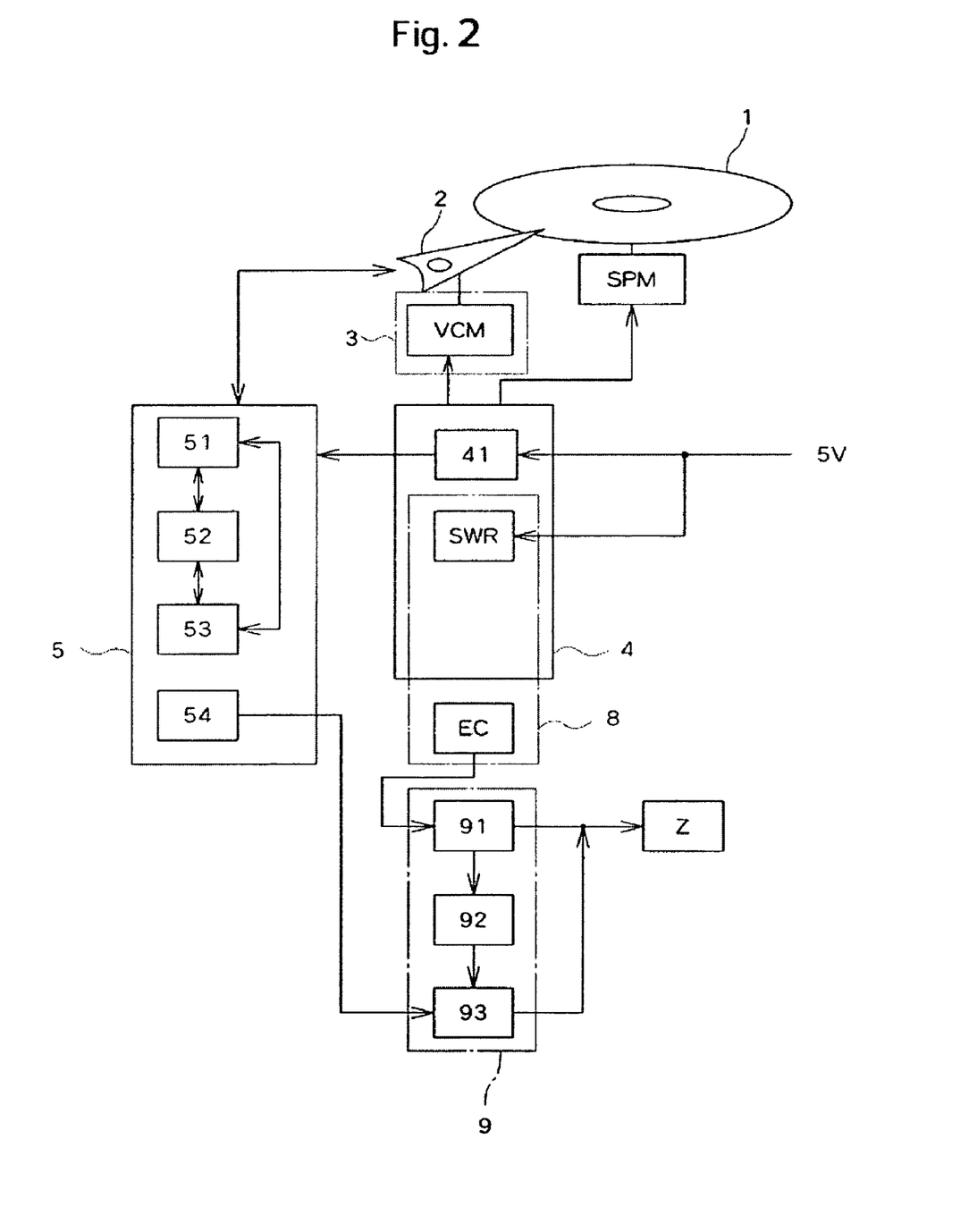
FIG. 2 is a block diagram showing the configuration of a disk drive according to another embodiment.

The first power supply unit 8 is made up of a switching regulator and directly generates a 1.5-V power supply voltage (the predetermined voltage) from the 5 V power supply voltage provided by the host side and supplies it to the load Z. This switching regulator includes a switching controller SWR and an external circuit EC for reducing ripple in its output power supply voltage. According to the present embodiment, the switching controller SWR may be provided outside the integrated circuit, or it may be included in the driver circuit unit 4 which is an analog integrated circuit, as shown in FIG. 2. It should be noted that in FIG. 2, components common to FIG. 1 are designated by the same reference numerals.

Figure 3:
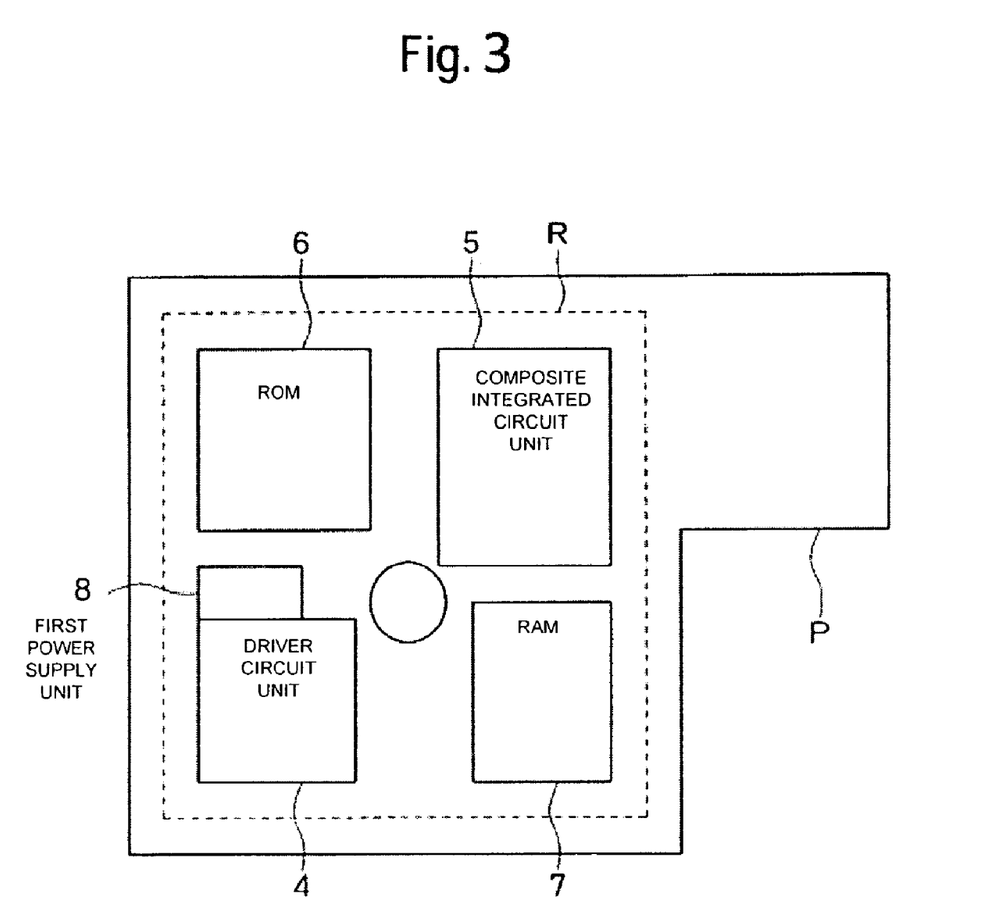
FIG. 3 is a diagram illustrating a layout on the printed board in a disk drive according to an embodiment.
Figure 4:
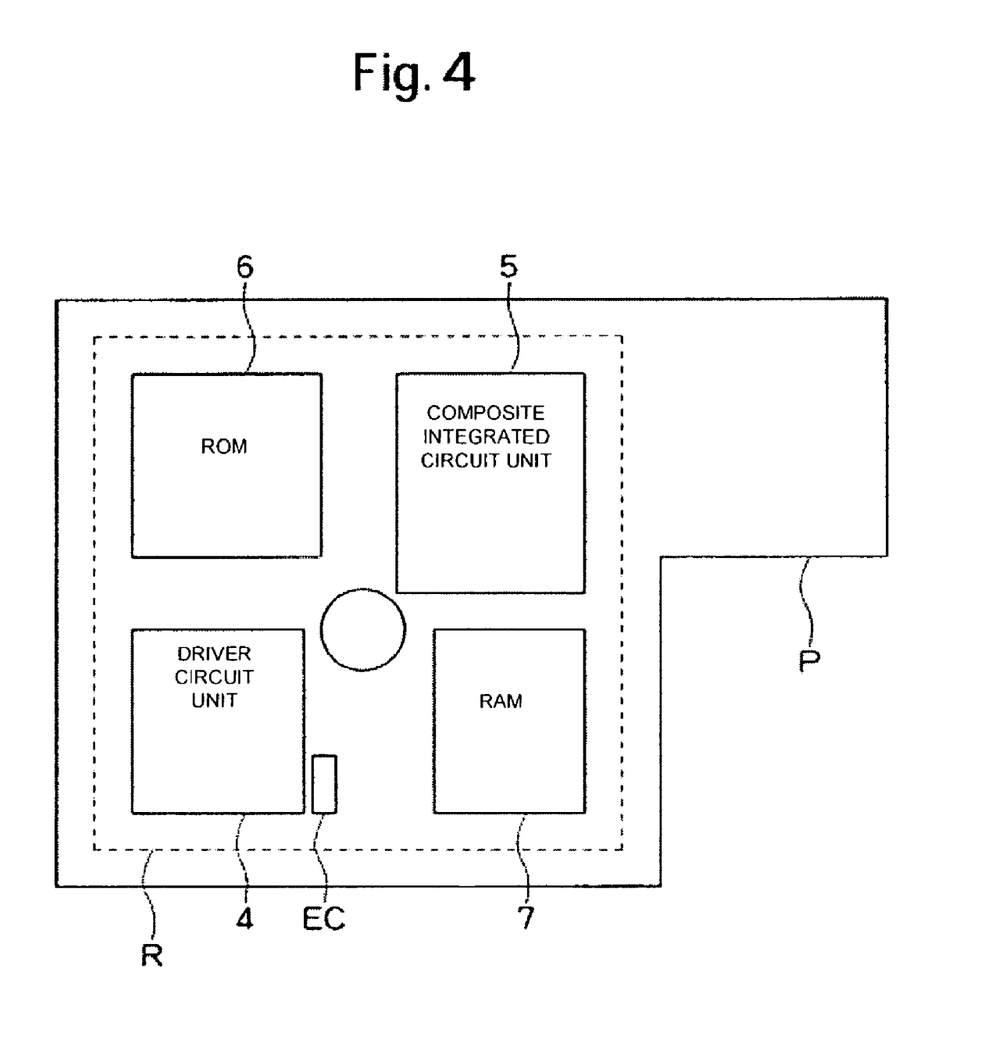
FIG. 4 is a diagram illustrating a layout on the printed board in a disk drive according to another embodiment.

FIG. 3 is a diagram illustrating an exemplary layout on the printed board in which the first power supply unit 8 is disposed outside the integrated circuit. In the example shown in FIG. 3, the ROM unit 6, the composite integrated circuit unit 5, the RAM unit 7, the driver circuit unit 4, and the first power supply unit 8 including the switching regulator are sequentially arranged clockwise from the upper left on the rectangular region (R) of the printed board P. FIG. 4, on the other hand, is a diagram illustrating an exemplary layout on the printed board in which the circuit portion of the switching controller SWR of the first power supply unit 8 is incorporated in the driver circuit unit 4 which is made up of an integrated circuit. In the example shown in FIG. 4, the ROM unit 6, the composite integrated circuit unit 5, the RAM unit 7, the external circuit EC of the first power supply unit 8, and the driver circuit unit 4 are sequentially arranged clockwise from upper left on the rectangular region (R) of the printed board P. Incorporating the switching controller SWR into the driver circuit unit 4 results in a reduction in the area on the printed board P required for mounting the first power supply unit 8, as shown in FIG. 4, facilitating the circuit layout on the printed board P. As a result, it is possible to reduce the size of the printed board P and hence the size of the magnetic disk drive.

Figure 5:
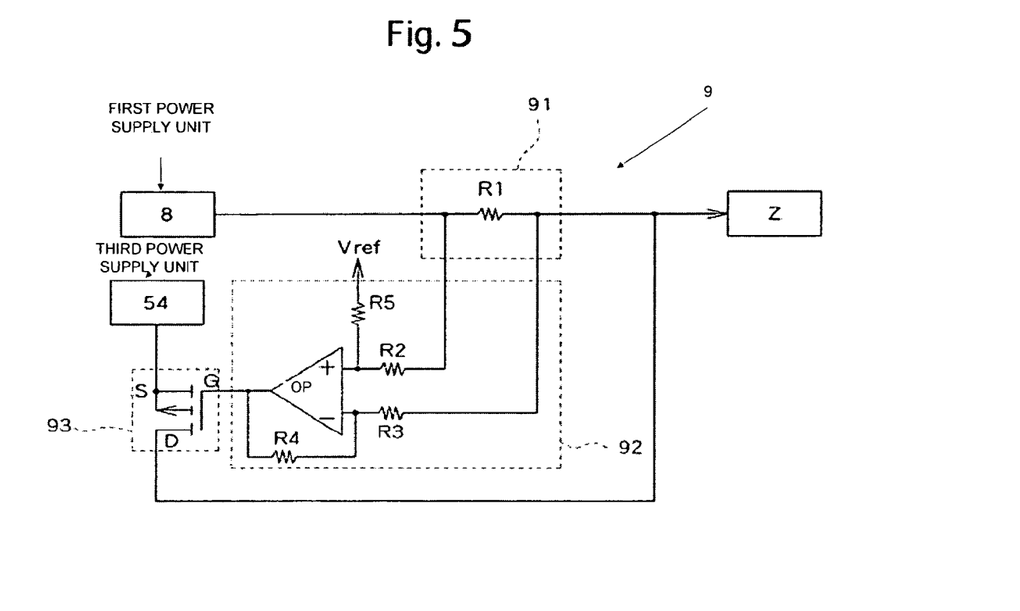
FIG. 5 is a schematic circuit diagram showing a power monitoring circuit in a disk drive according to an embodiment.

As shown in FIG. 5, the power monitoring circuit 9 includes: a detector 91 for detecting the power supplied from the first power supply unit 8 to the load; a comparator 92; and a switch 93. The detector 91 is implemented by, for example, connecting a resistor R1 in series between the output terminal of the first power supply unit 8 and the load Z. One end of the resistor R1 is connected to the inverting input terminal of the differential amplifier OP of the comparator 92 through a resistor R3, while the other end is connected to the noninverting input terminal through a resistor R2.

A reference voltage Vref is applied to the noninverting input terminal of the differential amplifier OP of the comparator 92 through a resistor R5. Further, the output of the differential amplifier OP is fed back to its inverting input terminal through a resistor R4.

The switch 93 is made up of a p-type MOSFET, and the output terminal of the differential amplifier OP is connected to the gate terminal G of the switch 93. Further, the source terminal S of the switch 93 receives the output of the third power supply unit 54, and the drain terminal D is connected to a point between the voltage detector 91 and the load.

The power monitoring circuit 9 operates as follows: The differential amplifier OP of the comparator 92 compares the voltage Vs between both terminals of the resistor R1 in the detector 91 with the reference voltage Vref, and produces different outputs depending on whether the voltage Vs is larger than the reference voltage Vref. In this example, if the voltage Vs between both the terminals of the resistor R1 is larger than the reference voltage Vref, the switch 93 is turned on; if the voltage Vs between both terminals of the sense resistance R1 is equal to or smaller than the reference voltage Vref, the switch 93 is turned off.

When the switch 93 is turned on, the output voltage of the third power supply unit 54 is fed to the drain terminal D through the source terminal S, thereby delivering the power from the third power supply unit 54 to the load Z. When the switch 93 is turned off, the power from the third power supply unit 54 is not delivered to the load Z. That is, the third power supply unit 54 operates as an auxiliary (or sub) power supply unit for the first power supply unit 8.

With this arrangement, when the power required by the load Z exceeds the maximum power Pmax that can be efficiently supplied by the first power supply unit 8 using a switching regulator, the switch 93 is turned on, allowing the power from the third power supply unit 54 acting as an auxiliary power supply unit to be fed to the load Z. It should be noted that in this case, the reference voltage Vref is set to satisfy the following equation.

$$V_{ref} = \sqrt{\frac{P_{max}}{R_1}} \qquad \text{[Equation 1]}$$

where $R_1$ is the resistance value of the sense resistor of the voltage detector 91.

Figure 6:
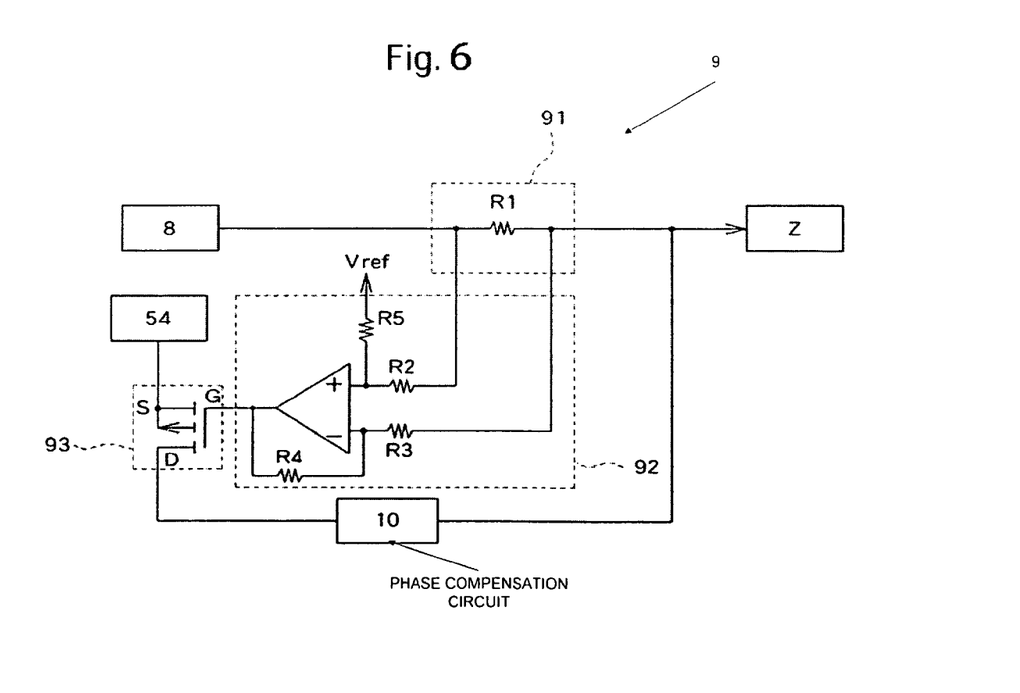
FIG. 6 is a schematic circuit diagram showing a power monitoring circuit in a disk drive according to another embodiment.

Further, a phase compensation circuit 10 may be provided between the switch 93 in the power monitoring circuit 9 and the load Z, as shown in FIG. 6. The phase compensation circuit 10 is, for example, an integral filter that includes a capacitor. This arrangement is advantageous in that if the difference between the voltage Vs across both terminals of the resistor R1 and the reference voltage Vref in the power monitoring circuit 9 is relatively small and hence the switch 93 oscillates between an on state and an off state, the phase compensation circuit 10 prevents this oscillation from affecting the load Z. It should be noted that in FIG. 6, components common to FIG. 5 are designated by the same reference numerals.

It should be noted that even though in the above example the detector 91 in the power monitoring circuit 9 detects the voltage between both terminals of the resistor R1 corresponding to the output current value in order to detect the power supplied from the first power supply unit 8, the present embodiment is not limited to this particular arrangement. The detector 91 may detect the center voltage of the resistive voltage divider provided in the output stage of the switching controller SWR in the first power supply unit 8 and determine whether this center voltage exceeds a predetermined value (which is equal to a value slightly lower than a certain voltage). In this case, an n-type MOSFET is used as the switch 93 since voltage must be detected.

Further, according to the present embodiment, the first power supply unit 8 may receive from the controller 53 of the composite integrated circuit unit 5 information on whether data is being either written to or read from the magnetic recording medium 1 and may change the switching frequency of the switching controller SWR depending on this determination. Specifically, if it is determined that data is being neither written to nor read from the magnetic recording medium 1, the first power supply unit 8 may set the switching frequency lower than when data is being written to or read from the magnetic recording medium 1, in order to maintain efficiency. In this case, no problem arises even if there are somewhat large ripples since data is being neither written nor read.

Further, the external circuit EC may be optimized so as to reduce ripples under high load conditions, that is, when data read/write operation is performed on the magnetic recording medium 1.

Thus, the present embodiment allows a magnetic disk drive to have increased efficiency of generation of power for its internal low-voltage blocks such as the analog block of the channel and the serial ATA low-voltage block. Further according to the present embodiment, when the power supplied by the first power supply unit 8 exceeds a predetermined power level, a power supply circuit using a linear regulator is additionally activated to help deliver the required power, thereby achieving stable power supply.

Further, although the present embodiment has been described with reference to an example in which the low-voltage blocks operate at 1.5 V and the other blocks operate at 3.3 V, the present embodiment is not limited to these particular voltage values.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
    a magnetic recording medium;
    a magnetic head for writing/reading information to/from said magnetic recording medium;
    a position control unit of a high voltage block configured to operate at a first voltage to move said magnetic head relative to said magnetic recording medium;
    a main power supply unit configured to supply power of a predetermined voltage lower than the first voltage to a load of a low voltage block, said main power supply unit including a switching regulator;
    a determination unit configured to detect said power supplied from said main power supply unit to said load and to determine whether said detected power exceeds a predetermined power level; and
    a sub-power supply unit of the high voltage block configured, if said determination unit determines that said power supplied from said main power supply unit to said load exceeds said predetermined power level, to supply power of said predetermined voltage to said load, said sub-power supply unit including a linear regulator.

2. The magnetic disk drive as claimed in claim 1, wherein the switching regulator of the main power supply unit comprises a switching controller.

3. The magnetic disk drive as claimed in claim 2, wherein the switching controller is incorporated into a driver circuit unit which includes a motor driver to drive one or more motors of the magnetic disk drive.

4. The magnetic disk drive as claimed in claim 1, wherein the determination unit comprises:
    a detector that detects power supplied from the main power supply unit;
    a comparator that compares a voltage across the detector with a reference voltage; and
    a switch that is turned on when the voltage across the detector exceeds the reference voltage and is turned off when the voltage across the detector does not exceed the reference voltage, the sub-power supply unit supplying power to the load when the switch is turned on.

5. The magnetic disk drive as claimed in claim 4, wherein the comparator comprises a differential amplifier.

6. The magnetic disk drive as claimed in claim 4, wherein the switch comprises a MOSFET.

7. A magnetic disk drive comprising:
    a magnetic recording medium;
    a magnetic head for writing/reading information to/from said magnetic recording medium;
    a position control unit configured to move said magnetic head relative to said magnetic recording medium;
    a main power supply unit configured to supply power of a predetermined voltage to a load, said main power supply unit including a switching regulator;
    a determination unit configured to detect said power supplied from said main power supply unit to said load and to determine whether said detected power exceeds a predetermined power level; and
    a sub-power supply unit configured, if said determination unit determines that said power supplied from said main power supply unit to said load exceeds said predetermined power level, to supply power of said predetermined voltage to said load, said sub-power supply unit including a linear regulator, the magnetic disk drive further comprising:
    a phase compensation circuit to compensate for a phase shift in said power supplied by said sub-power supply unit;

wherein said power supplied by said sub-power supply unit is fed to said load after said phase compensation circuit compensates for said phase shift.

8. A magnetic disk drive comprising:
a magnetic recording medium;
a magnetic head for writing/reading information to/from said magnetic recording medium;
a position control unit configured to move said magnetic head relative to said magnetic recording medium;
a main power supply unit configured to supply power of a predetermined voltage to a load, said main power supply unit including a switching regulator comprising a switching controller, and wherein the switching regulator of the main supply unit comprises an external circuit to reduce ripples in an output power supply voltage thereof;
a determination unit configured to detect said power supplied from said main power supply unit to said load and to determine whether said detected power exceeds a predetermined power level; and
a sub-power supply unit configured, if said determination unit determines that said power supplied from said main power supply unit to said load exceeds said predetermined power level, to supply power of said predetermined voltage to said load, said sub-power supply unit including a linear regulator.

9. A magnetic disk drive comprising:
a magnetic recording medium;
a magnetic head for writing/reading information to/from said magnetic recording medium;
a position control unit configured to move said magnetic head relative to said magnetic recording medium;
a main power supply unit configured to supply power of a predetermined voltage to a load, said main power supply unit including a switching regulator comprising a switching controller, and wherein the switching controller has a switching frequency that varies depending on whether data is being written to or read from the magnetic recording medium;
a determination unit configured to detect said power supplied from said main power supply unit to said load and to determine whether said detected power exceeds a predetermined power level; and
a sub-power supply unit configured, if said determination unit determines that said power supplied from said main power supply unit to said load exceeds said predetermined power level, to supply power of said predetermined voltage to said load, said sub-power supply unit including a linear regulator.

10. The magnetic disk drive as claimed in claim 9, wherein the switching frequency is lower when data is being neither written to nor read from the magnetic recording medium.

11. A magnetic disk drive comprising:
a magnetic recording medium;
a magnetic head for writing/reading information to/from said magnetic recording medium;
a position control unit of a high voltage block configured to operate at a first voltage to move said magnetic head relative to said magnetic recording medium;
a main power supply unit configured to supply power of a predetermined voltage lower than the first voltage to a load of a low voltage block, said main power supply unit including a switching regulator;
determining means for detecting said power supplied from said main power supply unit to said load and determining whether said detected power exceeds a predetermined power level; and
a sub-power supply unit of the high voltage block configured, if said determining means determines that said power supplied from said main power supply unit to said load exceeds said predetermined power level, to supply power of said predetermined voltage to said load, said sub-power supply unit including a linear regulator.

12. The magnetic disk drive as claimed in claim 11, wherein the switching regulator of the main power supply unit comprises a switching controller.

13. The magnetic disk drive as claimed in claim 12, wherein the switching controller in incorporated into a driver circuit unit which includes a motor driver to drive one or more motors of the magnetic disk drive.

14. A magnetic disk drive comprising:
a magnetic recording medium;
a magnetic head for writing/reading information to/from said magnetic recording medium;
a position control unit configured to move said magnetic head relative to said magnetic recording medium;
a main power supply unit configured to supply power of a predetermined voltage to a load, said main power supply unit including a switching regulator;
determining means for detecting said power supplied from said main power supply unit to said load and determining whether said detected power exceeds a predetermined power level; and
a sub-power supply unit configured, if said determining means determines that said power supplied from said main power supply unit to said load exceeds said predetermined power level, to supply power of said predetermined voltage to said load, said sub-power supply unit including a linear regulator, the magnetic disk drive further comprising:
compensating means for compensating for a phase shift in said power supplied by said sub-power supply unit;
wherein said power supplied by said sub-power supply unit is fed to said load after said compensating means compensates for said phase shift.

15. A magnetic disk drive comprising:
a magnetic recording medium;
a magnetic head for writing/reading information to/from said magnetic recording medium;
a position control unit configured to move said magnetic head relative to said magnetic recording medium;
a main power supply unit configured to supply power of a predetermined voltage to a load, said main power supply unit including a switching regulator comprising a switching controller, wherein the switching regulator of the main supply unit comprises an external circuit to reduce ripples in an output power supply voltage thereof;
determining means for detecting said power supplied from said main power supply unit to said load and determining whether said detected power exceeds a predetermined power level; and
a sub-power supply unit configured, if said determining means determines that said power supplied from said main power supply unit to said load exceeds said predetermined power level, to supply power of said predetermined voltage to said load, said sub-power supply unit including a linear regulator.

16. A magnetic disk drive comprising:
a magnetic recording medium;
a magnetic head for writing/reading information to/from said magnetic recording medium;
a position control unit configured to move said magnetic head relative to said magnetic recording medium;

a main power supply unit configured to supply power of a predetermined voltage to a load, said main power supply unit including a switching regulator comprising a switching controller, wherein the switching controller has a switching frequency that varies depending on whether data is being written to or read from the magnetic recording medium;

determining means for detecting said power supplied from said main power supply unit to said load and determining whether said detected power exceeds a predetermined power level; and a sub-power supply Unit configured, if said determining means determines that said power supplied from said main power supply unit to said load exceeds said predetermined power level, to supply power of said predetermined voltage to said load, said sub-power supply unit including a linear regulator.

17. The magnetic disk drive as claimed in claim 16, wherein the switching frequency is lower when data is being neither written to nor read from the magnetic recording medium.

* * * * *